March 13, 1951  D. B. GARDINER ET AL  2,544,987
POWER TRANSMISSION
Filed Jan. 4, 1947  2 Sheets-Sheet 1

INVENTORS
ERNST F. KLESSIG
DUNCAN B. GARDINER
JOHN F. JEANNIN
BY
Ralph L. Tweedale
ATTORNEY March 13, 1951 D. B. GARDINER ET AL 2,544,987
POWER TRANSMISSION
Filed Jan. 4, 1947 2 Sheets-Sheet 2

INVENTORS
ERNST F. KLESSIG
DUNCAN B. GARDINER
JOHN F. JEANNIN
BY
*Ralph L. Tweedale*
ATTORNEY Patented Mar. 13, 1951

2,544,987

UNITED STATES PATENT OFFICE 2,544,987

POWER TRANSMISSION

Duncan B. Gardiner, Detroit, Ernst F. Klessig, Berkeley, and John F. Jeannin, Detroit, Mich., assignors to Vickers Incorporated, Detroit, Mich., a corporation of Michigan Application January 4, 1947, Serial No. 720,142

12 Claims. (Cl. 103—135)

1

This invention relates to power transmissions, particularly to those of the type comprising two or more fluid pressure energy translating devices, one of which may function as a pump and another as a fluid motor.

More particularly, the invention relates to vane type pumps employing a vane rotor, cam ring, and side bushings forming a pump cartridge assembly adapted to be mounted in a counterbore in the body member on a drive shaft. In standard practice, the inlet passage in the pump body is of the closed core type which presents manufacturing difficulties and operating trouble resulting from foreign matter lodged in the passage and unexpectedly released during pumping operation.

In the present invention an open-faced cored inlet passage has been provided whereby the intricate arcuate cores have been dispensed with. In fact the inlet passage may be formed by machining a groove in the end face of pump recess. The present design also provides pump bushings adapted to form partitions between the open-faced inlet passage and the working chambers of the rotor.

One of the objects of the present invention is to provide a pump design employing an open-faced cored recess or groove as an inlet passage in the end face of the body counterbore.

Another object is to provide a pump body having an open-faced inlet passage separated from rotor working chambers by a bushing which functions as a partition.

Pumps of the balanced vane type are not inherently reversible, but require changes in the relative positions of certain elements. In the pump shown herein, the cartridge may be readily removed for conversion. Means are provided for assuring the assembly of the elements in their correct positions regardless of direction of rotation.

Therefore, an object of the invention is to provide a reversible vane pump of a simple and economical construction and foolproof assembly.

The body recess in which the pump cartridge is mounted is of the straight counterbore design with no mechanical provisions for adjusting the bearing tension of the element in relation to the operational friction. An end cap adapted to enter the counterbore is provided. A snap ring is employed for preventing the cap from being involuntarily removed. The cap is separated from the cartridge bushing in order to provide a pressure chamber communicating with the outlet pressure and the side of the bushing or pressure

2 head, whereby the pressure may maintain the pump elements in correct bearing relationship regardless of operating load.

Therefore, another object of the present invention is to provide pressure means for maintaining the pump elements in correct bearing relationship and varying the same in proportion to changes in the operating pressure.

Another object is to provide a simple pump design adapted to employ a snap ring as the sole assembly fastening means.

The general object of the present design is to provide a vane type pump adapted to be readily converted from one direction of rotation to the opposite direction and at the same time provide open-cored passages for admitting the suction fluid and delivering the pressure fluid in an economical and efficient manner.

Further objects, and advantages of the present invention will be apparent from the following description, reference being had to the accompanying drawings wherein a preferred form of the present invention is clearly shown.

Figure 1:
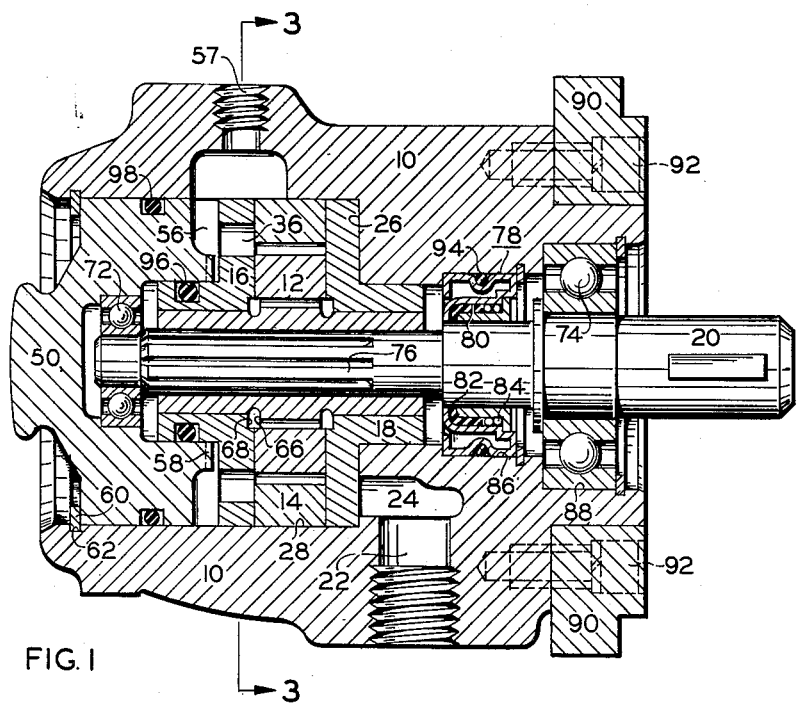
Figure 1 is a top plan view of a vane pump in section incorporating a preferred form of the invention.
Figure 2:
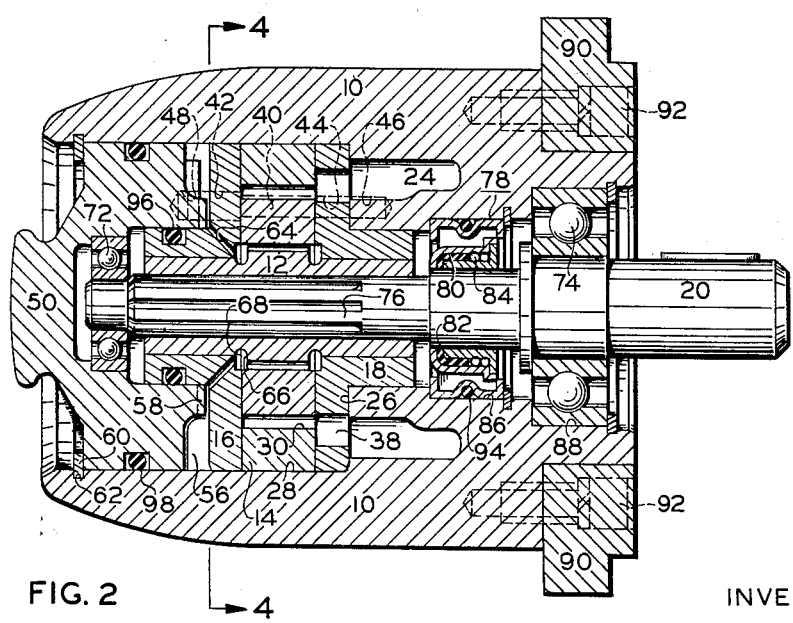
Figure 2 is a side elevation in section of the pump shown in Figure 1.
Figure 3:
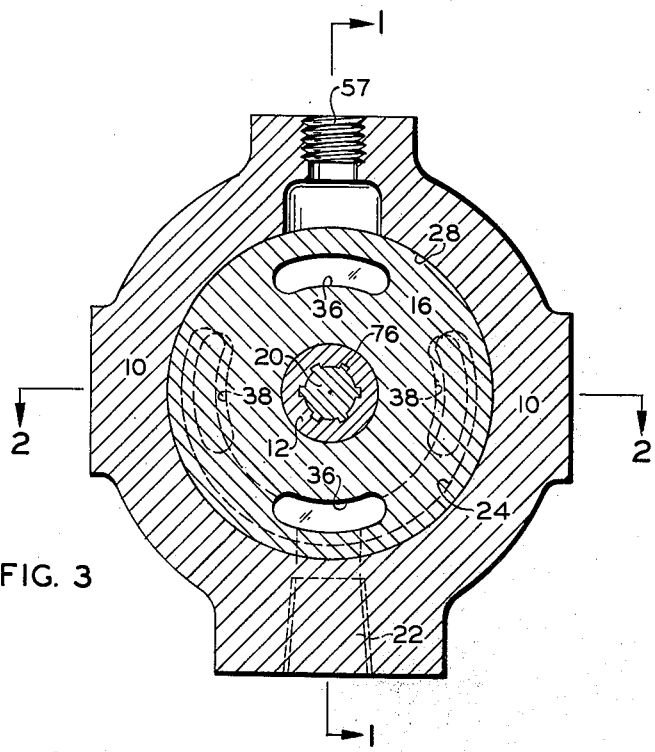
Figure 3 is a section on line 3—3 of Figure 1.

Referring now to Figures 1 and 2, the pump comprises a body 10 and a pump cartridge including a rotor 12, cam ring 14, and bushings or pressure heads 16 and 18 mounted on a drive shaft 20. The body 10 is provided with an inlet connection 22 which extends through the body to the open face cored passage 24 in the bottom face 26 of the counterbore 28. The rotor 12 is provided with vanes 30 reciprocably mounted in radial slots 32 and adapted to bear on vane ring 14 to form variable working chambers 34 between the bushings or pressure heads 16 and 18. Pressure head 18 is fixed in position but pressure head 16 is adapted to move axially on shaft 20. Outlet ports 36 in bushing 16 and inlet ports 38 in bushing 18 communicate with the working chambers 34 during rotation of the rotor 12.

It will thus be seen that a novel type of inlet passage has been provided to avoid the difficulties of intricate cored passages in the pump body. In fact the open passage 24 in face 26 of the pump recess 28 may be formed by direct machining operations. Therefore a groove 24 might be milled in the face 26 and connected to the external inlet 22 by a drilled passage.

Such open grooves 24 being adjacent working chambers 34 would normally communicate directly with rotor 12. In the present design the bushing 18 forms a partition wall between the grooves 24 and working chambers 34 and the admission of suction fluid is controlled by inlet port 38 through the bushing 18.

Figures 4, 5:
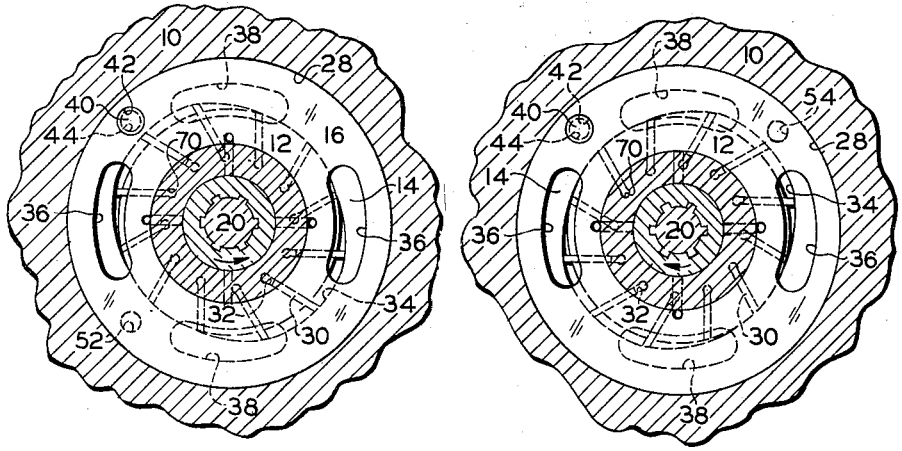
Figure 4 is a section on line 4—4 of Figure 2.
Figure 5 is a view similar to Figure 4 with the position of the cam ring and the rotor and vanes changed for opposite direction of rotation.

A pin 40 is adapted to angularly fix the pump cartridge elements in correct assembled positions. The pin 40 is adapted to fit holes 42 and 44 in bushings 16 and 18, respectively, and bottom in hole 46 of the body. The head of pin 40 is retained in hole 48 of the cap 50 and the central portion fits either hole 52 (Figure 4) or 54 (Figure 5) in ring 14 according to the the direction of rotation.

The cap 50 fits the counterbore 28 in body 10 and is normally separated axially from the rotor 12 to form pressure chamber 56 which communicates with outlet connection 57. The axially shiftable pressure head 16 is positioned in the pressure chamber 56 and adapted to be held in sealing contact with rotor 12 and ring 14. Lugs 58 prevent the cap 50 from bottoming on the bushing 16 and snap ring 60 is mounted in angular groove 62 of the counterbore against the outer rim of cap 50. The bushing 16 is provided with passages 64 connecting the pressure chamber 56 with the annular grooves 66 and 68 in the side of the rotor 12 and bushing 16, respectively, which in turn communicates with axial pressure passages 70 at the inner end of the vane slots 32 of rotor 12, all for the purpose of supplying pressure fluid beneath the vanes to hold them in contact with the ring.

Therefore, the advantages described above in relation to open groove 24 eliminating intricate cored passages through the body, also apply to the pressure chamber 56. It provides an economical means for directing pressure fluid from the diametrically opposed outlet ports 36 to the outlet connection 57. The bushing 16 also functions as a partition between the outlet passage or chamber 56 and the working chambers 34 similar to bushing 18.

The shaft 20 is rotatably supported by ball bearings 72 and 74 and is fixed to rotor 12 by spline 76. A shaft seal 78 is provided and comprises a guide member 80 for directing the cylindrical sealing element 82 radially against the shaft 20 under the pressure of spring 84.

The shaft, including the seal 78 and bearing 74, are inserted in bores 86 and 88, respectively, and the flange 90 is drawn up by the screws 92 to complete the assembly. Torus or O ring seals 94, 96, and 98 are employed on the periphery of the shaft seal 78, the hub of bushing 16, and the periphery of cap 50, respectively. The torus seal comprises a torus shaped resilient sealing element mounted in an angular groove and in contact with the adjacent surface of the mating piece.

In operation, regardless of the direction of rotation of drive shaft 20 and rotor 12, suction fluid is drawn in through inlet connection 22 and is conducted by passage 24 to the inlet ports 38 in bushing 18. As the working chambers 34 pass the inlet ports 38, fluid is admitted and conducted to outlet ports 36 in bushing 16 where the pressure fluid enters the pressure chamber 56 and is discharged therefrom to outlet connection 57.

To convert the pump for opposite rotation, the snap ring 60 is removed from the groove 62, and the cap 50 and pump cartridge withdrawn from the counterbore 28. The pin 40 is extracted from hole 54 and the rotor 12 is rotated axially end for end. The cam ring 14 is angularly displaced through 90° until the pin 40 will align and enter hole 52 in ring 14. The pump cartridge is then placed in the counterbore 28 and the end cap 50 is secured by snap ring 60.

The lugs 58 on cap 50 are adapted to bottom against bushing 16 to prevent the cap 50 from entering the counterbore 28 too far. However, the cap 50, including the lugs 58 are normally spaced from the bushing 16 by means of outlet pressure in chamber 56 acting to separate the cap 50 and bushing 16 by force. As the operating pressure increases, pressure in the working chambers 34 tends to separate the bushings. At the same time, operating pressure in pressure chamber 56 counteracts the internal pressure in the working chambers 34 and exerts a predominating force tending to shift the movable head 16 into sealing contact with the ring and rotor and thereby maintain the parts in correct bearing relationship in proportion to the variation in operating pressure.

It will thus be seen that the present invention is a novel vane type pump providing improved operational and construction characteristics as a result of the simplified design. This is accomplished in part by converting all passages to the open-faced core type and employing a straight counterbore pump recess and pressure means for maintaining the pump element in correct bearing relationship.

While the form of embodiment of the invention as herein disclosed constitutes a preferred form, it is to be understood that other forms might be adopted, all coming within the scope of the claims which follow.

What is claimed is as follows:

1. A rotary vane pump comprising a body provided with external inlet and outlet connections and having a cylindrical receiving recess, a rotary pumping unit of cylindrical form slidably positioned in said recess and including a vane carrying rotor circumscribed by a cam ring, two bushings, one on each side of the ring and rotor, inlet ports in one bushing and outlet ports in the other bushing, a groove in the end of the recess connected to one of the external body connections and adapted to communicate with the ports in the adjacent bushing, an end cap in the opposite end of the recess adjacent the other bushing but axially separated therefrom to form with the body a combined outlet duct and pressure chamber in communication with the ports in that bushing and also with the other external body connection whereby fluid delivered through said chamber urges the component parts of the pumping unit into compact engagement with each other and against the opposite end of the recess.

2. A rotary vane pump comprising a body provided with external inlet and outlet connections and having a cylindrical receiving recess, a rotary pumping unit of cylindrical form slidably positioned in said recess and including a vane carrying rotor circumscribed by a cam ring, two bushings, one on each side of the ring and rotor, diametrically opposed arcuate inlet ports in one bushing and diametrically opposed arcuate outlet ports in the other bushing, the inlet ports in one bushing being angularly displaced from the outlet ports in the other bushing by an angle of ninety degrees, a groove in the end of the recess connected to one of the external body connections and adapted to communicate with the ports in the adjacent bushing, an end cap in the opposite end of the recess adjacent the other bushing but axially separated therefrom to form with the body a combined outlet duct and pressure chamber in communication with the ports in that bushing and also with the other external body connection whereby fluid delivered through said chamber urges the component parts of the pumping unit into compact engagement with each other and against the opposite end of the recess.

3. In a vane pump of the type employing a body provided with a counterbore for receiving a pump cartridge including a rotor, cam ring, and two side bushings, inlet ports in one bushing and outlet ports in the other bushing, the cartridge elements being free to adjust their positions axially within confined limits, an end cap positioned in the mouth of the counterbore and normally separated from the outer bushing of the cartridge assembly for providing a combination passage and pressure chamber therebetween, means for directing all outlet pressure fluid through the chamber and maintaining the cartridge assembly elements in correct bearing relationship corresponding to the delivery pressure of the pump, and inlet passages in the body in communication with the inlet ports of the other bushing.

4. In a vane pump of the type employing a body provided with a counterbore for receiving a pump cartridge including a rotor, cam ring, and two side bushings, inlet ports in one bushing and outlet ports in the other bushing, an open face cored inlet passage in the end face of the counterbore adapted to communicate with the inlet ports in the bushing, and the cartridge elements being free to adjust their positions axially within confined limits, an end cap positioned in the mouth of the counterbore and normally separated from the outer bushing of the cartridge assembly for providing a combination passage and pressure chamber therebetween, means for directing all outlet pressure fluid through the chamber and maintaining the cartridge assembly elements in correct bearing relationship corresponding to the delivery pressure of the pump.

5. In a rotary pump the combination of a stator, a rotor mounted therein and forming a fluid intake zone and a fluid delivery zone, an inlet supply passage and a fluid delivery passage in the stator one on each side of the rotor, the inlet supply passage leading directly to the fluid intake zone, means forming a fluid pressure delivery chamber in the stator connected to the fluid delivery passage and immediately adjacent the rotor, a cheek plate floatably mounted in the chamber, and a fluid delivery port extending through the cheek plate registering with the fluid delivery zone and directly connecting the delivery zone to the delivery chamber, said cheek plate being maintained in fluid sealing engagement aaginst the rotor by fluid pressure in the fluid delivery chamber delivered thereto through said port.

6. In a rotary pump the combination of a stator having a pumping recess, a rotor mounted in the recess and forming a fluid intake zone and a fluid delivery zone, said rotor carrying a plurality of substantially radially movable vanes which pass through the zones as the rotor turns, an inlet supply passage and a fluid delivery passage in the stator one on each side of the rotor, the inlet supply passage leading directly to the fluid intake zone, means forming a fluid pressure delivery chamber in the stator connected to the fluid delivery passage and immediately adjacent the rotor, a cheek plate floatably mounted in the chamber, and a fluid delivery port extending through the cheek plate registering with the fluid delivery zone and directly connecting the delivery zone to the delivery chamber, said cheek plate being maintained in fluid sealing engagement against the rotor by fluid pressure in the fluid delivery chamber delivered thereto through said port.

7. In a rotary pump the combination of a stator, a rotor mounted therein and forming a plurality of fluid intake zones and a plurality of fluid delivery zones, an inlet supply passage and a fluid delivery passage in the stator one on each side of the rotor, the inlet supply passage having branches leading directly to the fluid intake zones, means forming a fluid pressure delivery chamber in the stator as a part of the fluid delivery passage and immediately adjacent the rotor, a cheek plate floatably mounted in the chamber, and fluid delivery ports extending through the cheek plate registering with the fluid delivery zones and directly connecting the delivery zones to the delivery chamber, said cheek plate being maintained in fluid sealing engagement against the rotor by fluid pressure in the fluid delivery chamber delivered thereto through said ports.

8. In a rotary pump the combination of a stator having a pumping recess, a rotor mounted in the recess and forming a plurality of fluid intake zones and a plurality of fluid delivery zones, said rotor carrying a plurality of substantially radially movable vanes which pass through the zones as the rotor turns, an inlet supply passage and a fluid delivery passage in the stator one on each side of the rotor, the inlet supply passage having branches leading directly to the fluid intake zones, means forming a fluid pressure delivery chamber in the stator as a part of the fluid delivery passage and immediately adjacent the rotor, a cheek plate floatably mounted in the chamber, and fluid delivery ports extending through the cheek plate registering with the fluid delivery zones and directly connecting the delivery zones to the delivery chamber, said cheek plate being maintained in fluid sealing engagement against the rotor by fluid pressure in the fluid delivery chamber delivered thereto through said ports.

9. In a rotary pump, the combination of a housing having a pumping chamber, pumping mechanism mounted in the chamber including means forming a fluid inlet zone and a fluid outlet zone, an inlet passage in the housing completely on one side of the pumping mechanism and leading to the fluid inlet zone, an end member secured to the housing on the opposite side of, and having a portion spaced from, the pumping mechanism to form a combined outlet duct and fluid delivery chamber, a cheek plate floatably mounted in the delivery chamber, and porting means connecting the fluid outlet zone to the delivery chamber on the side of the cheek plate opposite to that facing the pumping mechanism, said cheek plate being maintained in fluid sealing engagement against the pumping mechanism by fluid pressure in the fluid delivery chamber.

10. In a rotary pump, the combination of a housing having a pumping chamber, pumping mechanism mounted in the chamber including means forming a fluid inlet zone and a fluid outlet zone, an inlet passage in the housing completely on one side of the pumping mechanism and leading to the fluid inlet zone, an end member secured to the housing on the opposite side of, and having a portion spaced from, the pumping mechanism to form a combined outlet duct and fluid delivery chamber, and a cheek plate floatably mounted in the delivery chamber and having an outlet opening extending therethrough registering with the fluid outlet zone, said cheek plate being maintained in fluid sealing engagement against the pumping mechanism by fluid pressure in the delivery chamber delivered thereto through the cheek plate outlet opening.

11. A rotary vane pump comprising a housing having a pumping chamber, a slotted rotor carrying a plurality of substantially radially movable vanes and mounted in the chamber to form a fluid intake zone and a fluid outlet zone through which the vanes move as the rotor turns, an inlet passage in the housing completely on one side of the rotor and leading directly to the fluid intake zone, an end member secured to the housing on the opposite side of, and having a portion spaced from, the rotor to form a combined outlet duct and fluid delivery chamber immediately adjacent the rotor, a cheek plate floatably mounted in the delivery chamber, and porting means connecting the fluid outlet zone to the fluid delivery chamber on the side of the cheek plate opposite to that facing the rotor, said cheek plate being maintained in fluid sealing engagement against the rotor by fluid pressure in the fluid delivery chamber.

12. A rotary vane pump comprising a housing having a pumping chamber, a slotted rotor carrying a plurality of substantially radially movable vanes and mounted in the chamber to form a fluid intake zone and a fluid outlet zone through which the vanes move as the rotor turns, an inlet passage in the housing completely on one side of the rotor and leading directly to the fluid intake zone, an end member secured to the housing on the opposite side of, and having a portion spaced from, the rotor to form a combined outlet duct and fluid delivery chamber immediately adjacent the rotor, a pressure responsive cheek plate floatably mounted in the delivery chamber and having an outlet opening extending therethrough registering with the fluid outlet zone, said cheek plate being maintained in fluid sealing engagement against the rotor by fluid pressure in the delivery chamber delivered thereto through the cheek plate outlet opening.

DUNCAN B. GARDINER.
ERNST F. KLESSIG.
JOHN F. JEANNIN.

REFERENCES CITED

The following references are of record in the file of this patent:

UNITED STATES PATENTS

| Number | Name | Date |
|---|---|---|
| 715,722 | Womer | Dec. 6, 1902 |
| 904,781 | Hoard et al. | Nov. 24, 1908 |
| 994,392 | Hauer | June 6, 1911 |
| 1,010,956 | Read et al. | Dec. 5, 1911 |
| 1,048,453 | Holt | Dec. 24, 1912 |
| 1,590,384 | Kucher | June 29, 1926 |
| 1,635,522 | Wilson | July 12, 1927 |
| 1,730,145 | Hildreth | Oct. 1, 1929 |
| 1,989,900 | Vickers | Feb. 5, 1935 |
| 2,096,490 | Hansen | Oct. 19, 1937 |
| 2,141,170 | Centervall | Dec. 27, 1938 |
| 2,312,891 | Ferris | Mar. 2, 1943 |
| 2,313,075 | Kendrick et al. | Mar. 9, 1943 |
| 2,372,816 | Deschamps et al. | Apr. 3, 1945 |
| 2,384,872 | Baker et al. | Sept. 18, 1945 |
| 2,393,223 | Rosen | Jan. 15, 1946 |
| 2,420,622 | Roth et al. | May 13, 1947 |
| 2,423,507 | Lawton | July 8, 1947 |

FOREIGN PATENTS

| Number | Country | Date |
|---|---|---|
| 233,064 | Great Britain | May 7, 1925 |
| 274,041 | Great Britain | Oct. 27, 1927 |